(12) United States Patent
Willoughby

(10) Patent No.: US 10,754,660 B2
(45) Date of Patent: Aug. 25, 2020

(54) RACK LEVEL SERVER BOOT

(71) Applicant: International Business Machines Corporation, Armonk, NY (US)

(72) Inventor: David R. Willoughby, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 32 days.

(21) Appl. No.: 16/156,180

(22) Filed: Oct. 10, 2018

(65) Prior Publication Data
US 2020/0117472 A1 Apr. 16, 2020

(51) Int. Cl.
*G06F 9/44* (2018.01)
*G06F 9/4401* (2018.01)
*H04L 29/06* (2006.01)

(52) U.S. Cl.
CPC .......... *G06F 9/4408* (2013.01); *G06F 9/4416* (2013.01); *H04L 63/0876* (2013.01)

(58) Field of Classification Search
CPC ... G06F 9/4408; G06F 9/4416; H04L 63/0876
See application file for complete search history.

(56) References Cited

U.S. PATENT DOCUMENTS

| | | | |
|---|---|---|---|
| 6,990,573 B2* | 1/2006 | Cherian | G06F 9/4416 709/222 |
| 7,584,347 B2 | 9/2009 | El-Haj-Mahmoud et al. | |
| 8,312,471 B2* | 11/2012 | Davis | G06F 12/0866 718/1 |
| 8,661,237 B2 | 2/2014 | Chou et al. | |
| 8,843,602 B2* | 9/2014 | Maruyama | G06F 9/4416 709/220 |
| 9,135,044 B2* | 9/2015 | Maharana | G06F 9/45558 |
| 2014/0122860 A1 | 5/2014 | Jai et al. | |
| 2014/0129819 A1 | 5/2014 | Huang et al. | |
| 2015/0277937 A1 | 10/2015 | Swanson et al. | |
| 2016/0014073 A1 | 1/2016 | Reddy et al. | |
| 2016/0299767 A1 | 10/2016 | Mukadam | |
| 2017/0054603 A1 | 2/2017 | Kulkarni et al. | |

FOREIGN PATENT DOCUMENTS

EP 2416244 A1 2/2012

OTHER PUBLICATIONS

Anonymous, "LSI Syncro MX-B Rack Boot Appliance," LSI Corporation, Product Brief, 2012, 2 pages.

* cited by examiner

*Primary Examiner* — Stefan Stoynov
(74) *Attorney, Agent, or Firm* — Cantor Colburn LLP; Teddi Maranzano

(57) ABSTRACT

Methods, systems and computer program products for remotely providing local server boot capabilities are provided. Aspects include receiving a command to boot a specified server of a plurality of servers by a rack level server boot device from remote user device. Aspects also include identifying a target emulated hard drive of a plurality of emulated hard drives of the rack level server boot device. The target emulated hard drive may be associated with a port of a plurality of ports of the rack level server that is connected to the specified server. Aspects also include selecting a specified OS boot image of one or more OS boot images stored by a memory of the rack level server boot device. Aspects further include causing the specified server to boot from the target emulated hard drive using the specified OS boot image.

20 Claims, 5 Drawing Sheets

400

RACK LEVEL SERVER BOOT

BACKGROUND

The present invention generally relates to server booting, and more specifically, to remotely providing local server boot capabilities.

It is common today for a rack of servers to either boot from a local device such as a hard drive or DVD or boot from a remote cloud-based system via a local area network. However, each method has drawbacks. Booting from a local hard drive/DVD is cumbersome, as it requires significant setup and maintenance of a local operating system. Further, because the conventional method of booting from a local hard drive generally requires someone to physically connect a local device to each individual server to boot, this method may prevent a critical booting operation from occurring in a timely fashion if there is no one on site to perform the booting operation or it takes the person too long to find the right disk/equipment and/or the correct server. Local devices could also be subject tampering, replacing a local device with one that has malicious software hidden inside. Booting over a network is cumbersome, as it requires significant setup and maintenance of configuration, both on the server and on the remote boot device. Further, maintaining a relationship between a physical server in the rack and the operating system server across a network can be difficult. Remote booting can also be cumbersome because the remote server may need to be within the broadcast domain of the server that is booting, which provides opportunities for inadequate network configurations to cause problems.

SUMMARY

Embodiments of the present invention are directed to a computer-implemented method for remotely providing local server boot capabilities. A non-limiting example of the computer-implemented method includes receiving, by a rack level server boot device from a remote user device, a command to boot a specified server of a plurality of servers. Each of the plurality of servers may be connected to one of a plurality of ports of the rack level server boot device. The method also includes identifying, based on the command, a target emulated hard drive of a plurality of emulated hard drives disposed on the rack level server boot device. Each of the plurality of emulated hard drives may be associated with at least one of the ports of the plurality of ports of the rack level server boot device. The target emulated hard drive may be associated with a port of the plurality of ports of the rack level server boot device that is connected to the specified server. The method includes selecting, based on the command, a specified OS boot image of one or more OS boot images stored by a memory of the rack level server boot device. The method further includes causing the specified server to boot from the target emulated hard drive using the specified OS boot image.

Embodiments of the present invention are directed to a system for remotely providing local server boot capabilities. The system includes a memory having computer readable computer instructions, and a processor for executing the computer readable instructions. The computer readable instructions include instructions for receiving, from a remote user device, a command to boot a specified server of a plurality of servers. Each of the plurality of servers may be connected to one of a plurality of ports of a rack level server boot device. The computer readable instructions also include instructions for identifying, based on the command, a target emulated hard drive of a plurality of emulated hard drives disposed on the rack level server boot device. Each of the plurality of emulated hard drives may be associated with at least one of the ports of the plurality of ports of the rack level server boot device. The target emulated hard drive may be associated with a port of the plurality of ports of the rack level server boot device that is connected to the specified server. The computer readable instructions also include instructions for selecting, based on the command, a specified OS boot image of one or more OS boot images stored by a memory of the rack level server boot device. The computer readable instructions also include instructions for causing the specified server to boot from the target emulated hard drive using the specified OS boot image.

Embodiments of the invention are directed to a computer program product for remotely providing local server boot capabilities, the computer program product comprising a computer readable storage medium having program instructions embodied therewith. The computer readable storage medium is not a transitory signal per se. The program instructions are executable by a processor to cause the processor to perform a method. A non-limiting example of the method includes receiving, by a rack level server boot device from a remote user device, a command to boot a specified server of a plurality of servers. Each of the plurality of servers may be connected to one of a plurality of ports of the rack level server boot device. The method also includes identifying, based on the command, a target emulated hard drive of a plurality of emulated hard drives disposed on the rack level server boot device. Each of the plurality of emulated hard drives may be associated with at least one of the ports of the plurality of ports of the rack level server boot device. The target emulated hard drive may be associated with a port of the plurality of ports of the rack level server boot device that is connected to the specified server. The method includes selecting, based on the command, a specified OS boot image of one or more OS boot images stored by a memory of the rack level server boot device. The method further includes causing the specified server to boot from the target emulated hard drive using the specified OS boot image.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
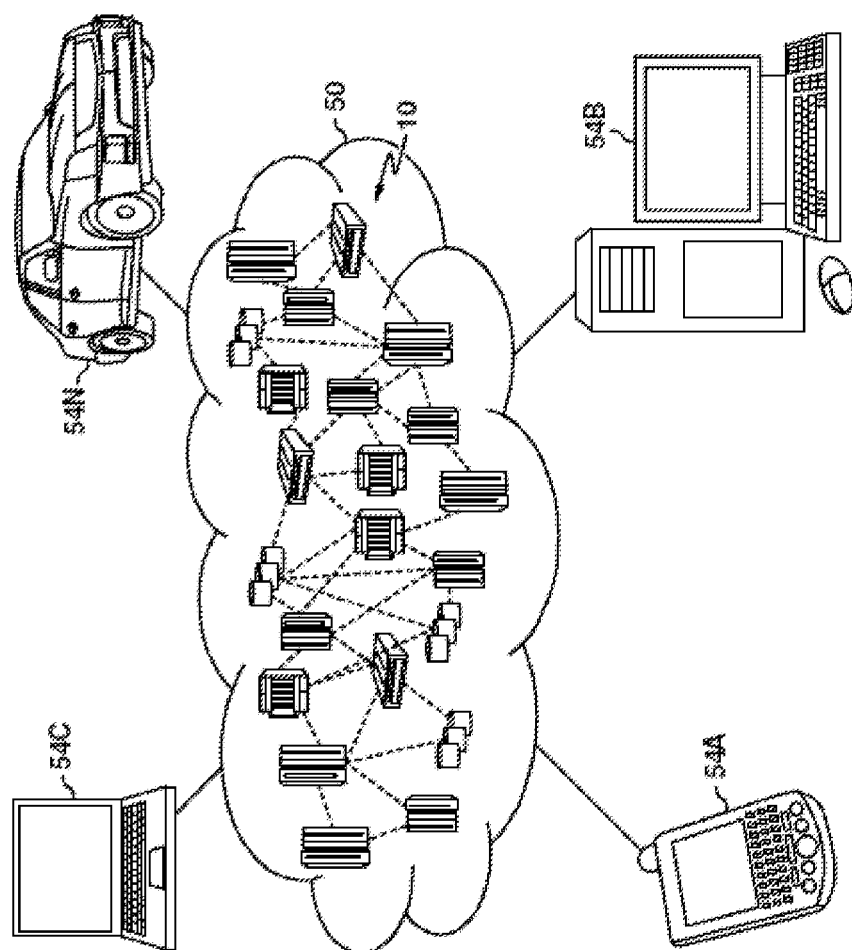
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
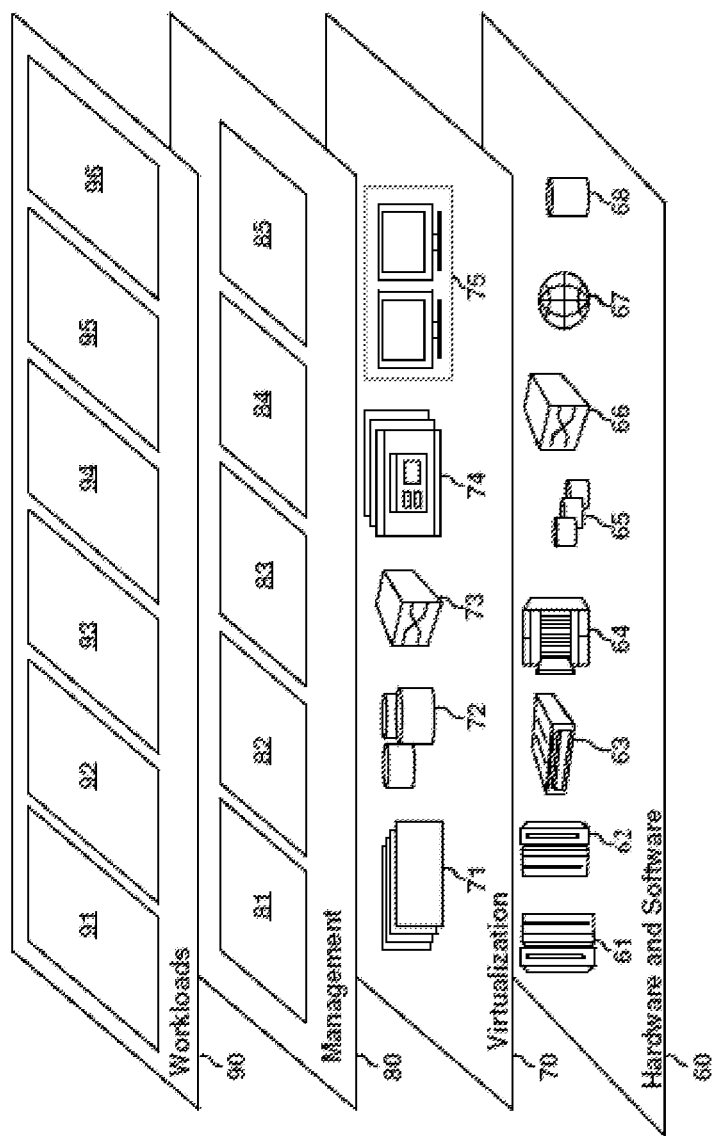
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and remotely providing local server boot capabilities 96.

Figure 3:
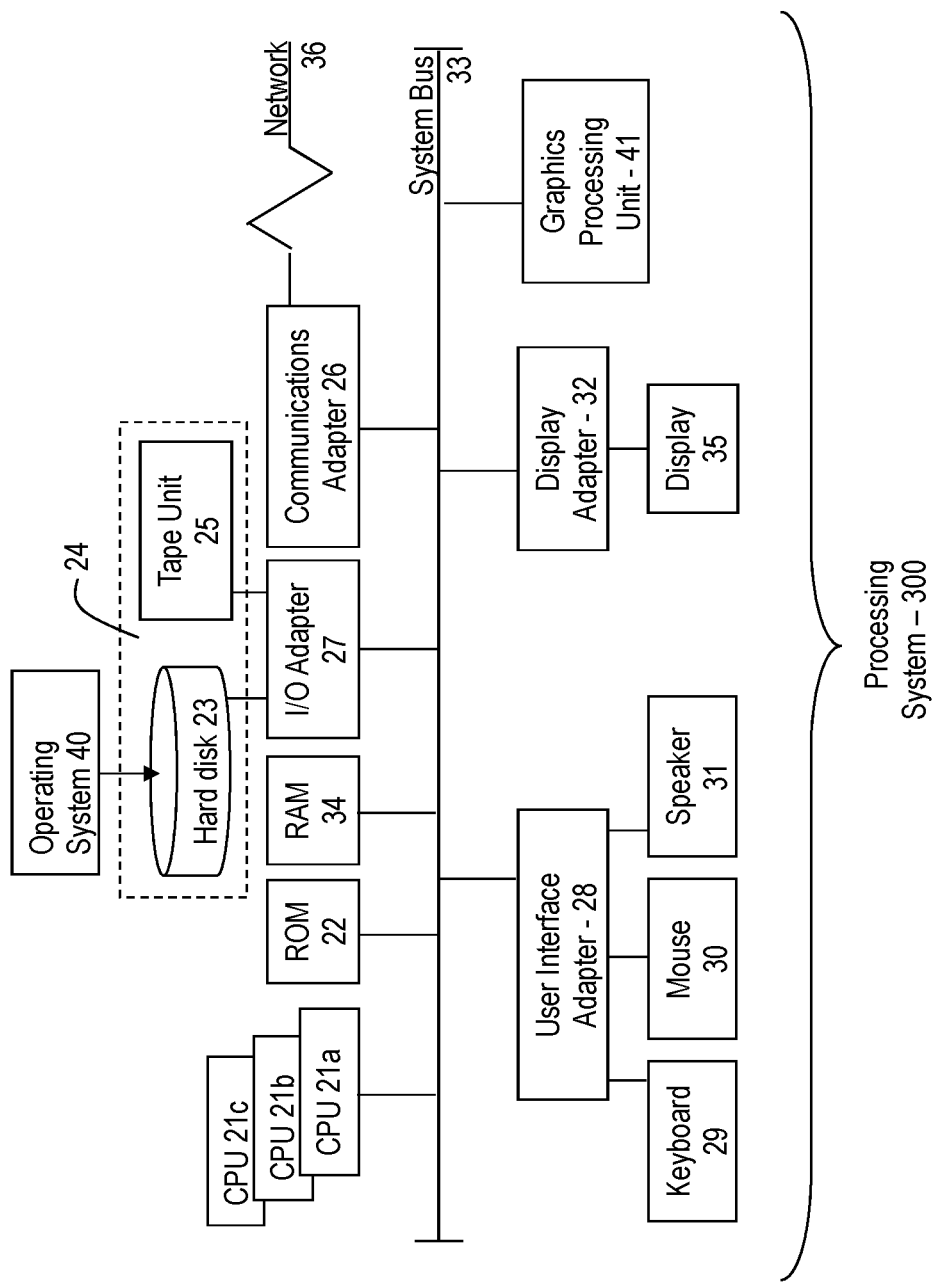
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

In exemplary embodiments, a system for remotely providing local server boot capabilities is provided. In exemplary embodiments, a rack level server boot device can be included in a server rack that houses a plurality of servers. The rack level server boot device can include a plurality of ports, such as USB ports. Each of the plurality of servers can connect to the rack level server boot device by connecting one end of a communication wire (e.g., a USB wire) to a respective server and the other end of the wire into one of the plurality of ports of the rack level server boot device. Based on the cabling pattern, the physical location of each of the plurality of servers may be known by the rack level server boot device, by for example, connecting a first port to a server in a first server rack location, connecting a second port to a server in a second server rack location, and so on. The rack level server boot device may include software for emulating a plurality of hard drives and each emulated hard drive may be associated with one of the plurality of ports. Thus, from the perspective of each of the plurality of servers, it appears to the server that the server is connected to a unique hard drive for the boot firmware of the server, so no customization is required to the servers in the rack. The rack level server boot device may store one or more OS boot images. As will be appreciated by those of skill in the art, an emulated hard drive of the rack level server boot device can be configured to boot a connected server using one of the OS boot images. Further, the rack level server boot device may only need to store a single copy of an operating system, a software application or the like, that multiple OS boot images may be based on. For example, based on one copy of a specific operating system, the rack level server boot device may store three different OS boot images that all include the specific operating system but include different software applications, configurations, or other features. Further, in some embodiments, because each server of the server rack is connected to an emulated hard drive, different servers can be simultaneously booted using different OS boot images.

The rack level server boot device may also include software that can allow it to communicate with remote user devices via the internet, such that the rack level server boot device may receive commands to perform local operations on one or more of the plurality of servers, such as booting the server with a selected OS boot image, resetting a server, rebooting a server, and/or powering a server on and/or off. The rack level server boot device may include software to authenticate a remote user and provide the user with access to a set of functionalities relating to the operation of the rack level server boot device based on a security clearance associated with the remote user. For example, a remote user may log into the rack level server boot device via a mobile application on the user's smartphone, provide a username and password, and then be presented with certain functions (e.g., boot, reboot, reset, power off/on, etc.) and/or the ability to execute functions with respect to certain servers of the plurality of servers, based on the user's associated security clearance level. In this way, the rack level server boot device can provide a remote user with the ability to initiate locally performed server boot capabilities that eliminates both the technical difficulties of the remotely booting a server over a network and booting a server from a local device described above.

Figure 4:
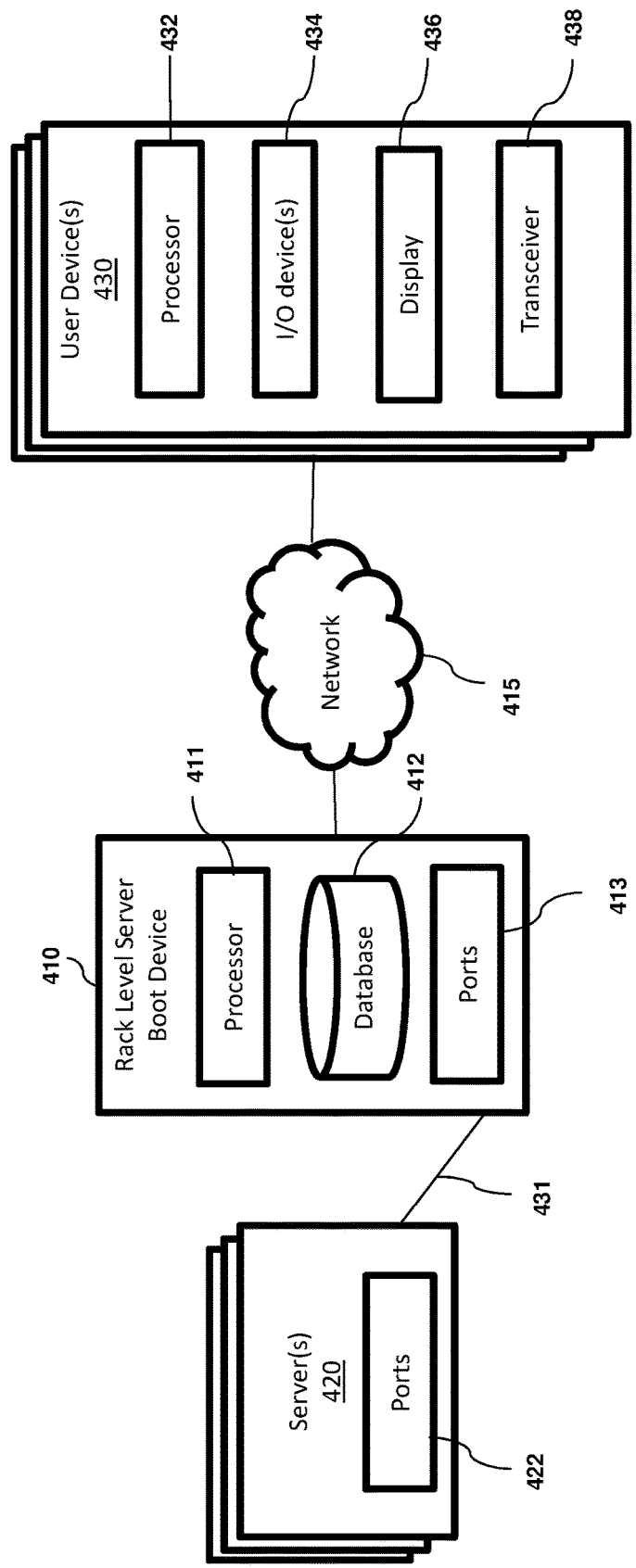
FIG. 4 depicts a system upon which remotely providing local server boot capabilities may be be implemented according to one or more embodiments of the present invention.

Turning now to FIG. 4, a system 400 for remotely providing local server boot capabilities will now be described in accordance with an embodiment. The system 400 includes a rack level server boot device 410 that is directly connected to a plurality of servers 420 via cabling 431 and can be in communication with user devices 430 via communications network 415. The rack level server boot device 410 can be connected to network 415 via a wired connection (e.g., Ethernet) or wireless (e.g., Wi-Fi). The communications network 415 may be one or more of, or a combination of, public (e.g., Internet), private (e.g., local area network, wide area network, virtual private network), and may include wireless and wireline transmission systems (e.g., satellite, cellular network, terrestrial networks, etc.). The rack level server boot device 410 is configured to perform booting operations on one or more selected servers 420 based on commands that can be remotely received from one or more user devices 430.

In exemplary embodiments, rack level server boot device 410 can be implemented as a computer system or processing system, such as the processing system 300 described hereinabove and illustrated in FIG. 3. In some embodiments, rack level server boot device 410 can include a processor 411, a database 412 (or other memory) and a plurality of ports 413. The rack level server boot device 410 can have a body that is shaped to fit on a server rack. For example, a rack level server boot device 410 may be a generally rectangular box shape and may have a height of one rack unit (RU) so that it may easily fit into a conventional server rack. According to some embodiments, the plurality of port 413 may be disposed on a front face or the rear face or both the front and rear face of the rack level server boot device 410 for easy access. In various embodiments, the plurality of ports 413 may be USB ports, Ethernet ports, firewire ports, SCSI ports, serial ports, fiber optics ports or any other suitable electrical connector ports that may serve to communicatively connect a server 420 to the rack level server boot device 410. Similarly, cabling 431 can be any type of cabling that is configured to plug into the port 413 of the rack level server boot device 410 and the corresponding ports 422 of the servers 420 (e.g., USB cables, Ethernet cables, etc.). In some embodiments, the rack level server boot device 410 may include one or more externally visible lights associated with each port 413 that may indicate whether data is currently being transferred using the port 413 or whether there is an error. Such indicators may also be displayed electronically in a user interface of a remotely connected user device 430. As describe further below, the rack level server boot device 410 can be configured to serve as a centralized manager of server activities, by receiving commands from one or more remote user devices 430. According to some embodiments, the rack level server boot device 410 can also include input/output devices such as a mouse, a keyboard, a display and the like (or, alternatively ports to allow such removable I/O devices to be used with the rack level server boot device 410) to allow a local user to enter commands to boot servers, modify or upload OS boot images, and perform other functionalities of the rack level server boot device 410 described herein.

According to some embodiments, the rack level server boot device 410 can store one or more OS boot images, operating system files, software application files and the like in memory (e.g., in database 412). In some embodiments, the rack level server boot device 410 can include and execute hard drive emulation software for creating a plurality of emulated hard drives. As will be appreciated by those of skill in the art, an emulated hard drive may mimic the functionality of a physical hard drive and may appear to a connected device as being substantially the same as a physical hard drive. According to some embodiments, the rack level server boot device 410 can associate each emulated hard drive with one of the plurality of ports 413 such that any device connected to a given port 413 will interact with the emulated hard drive associated with that port 413. Accordingly, each emulated hard drive is configured to interact with a server 420 that is connected to the port 413 that is associated with the emulated hard drive. Thus, a particular server 420 can boot from the emulated hard drive associated with the port 413 that the particular server 420 is connected to. The emulated hard drive can boot the connected server using one of one or more stored OS boot images. For example, a first server may boot from a first emulated hard drive using a first OS boot image and a second server may boot from a second emulated hard drive using a second OS boot image.

An OS boot image may be a premade operating system install that can be copied from a server (e.g., rack level server boot device 410) to a production unit's (e.g., server 420) hard drive that may include the drivers, third party applications, and customized tweaks to the operating system. Booting from an OS boot image is generally significantly faster than separately installing each file included in the OS boot image. As will be understood by those of skill in the art, different OS boot images may include different operating systems, applications, features, configurations etc., and thus the rack level server boot device 410 can, for example, be configured to boot different servers 420 with different operating systems and other programs. Additionally, a single OS boot image may be used to boot a number of different servers 420. In this way, an OS boot image stored by the rack level server boot device 410 that is used to boot multiple servers 420 need only be updated once in order for updates to be made to the associated servers 420 (e.g., updates can be made by servers 420 upon being rebooted). Thus, the system 400 provides efficiencies for situations where, for example, all (or many) of the servers 420 boot from the same OS boot image. On the flip side, in a situation where each (or many) server 420 boots from its own unique OS boot image, the rack level server boot device 410 can provide centrally stored and accessible customized OS boot images that can be readily associated with the proper servers 420 based on a known pattern of cabling 431. Accordingly, the configuration of the system 400 eliminates the technical difficulties of locating the correct server 420 and using the correct network configuration (e.g., maintaining proper IP/Ethernet MAC address mapping) to boot a given OS boot image, which may be presented by conventional systems of booting an OS image that is stored remotely in a networked device.

Further, in some embodiments, the rack level server boot device 410 may include software that is configured to facilitate communication between the rack level server boot device 410 and one or more user devices 430 to allow a user of a user device 430 to remotely control boot functionalities provided by the rack level server boot device 410. For example, in response to receiving a command from a user device 430, the rack level server boot device 410 may boot a specified server using a specified OS boot image. According to some embodiments, the rack level server boot device 410 can be configured to boot, reboot, reset, hard reset, power on or power off one or more selected servers 420. According to some embodiments, booting (or rebooting) a server 420 may mean to load software onto the server 420 and take the server from a non-functional state to an operational state. In some embodiments, resetting a server 420 may mean rebooting the server 420 when the operating system (OS) of the server 420 is healthy enough to act on a command but the server 420 may be having other software failures. In some embodiments, performing a hard reset may mean rebooting the server 420 when the OS of the server 420 has become unresponsive. According to some embodiments, the rack level server boot device 410 can be configured to store and boot a special purpose OS image by one or more servers 420. A special purpose OS image can be an OS image that is specifically created to diagnose and/or guide repair of a server 420 or update the firmware of a server 420. According to some embodiments, the rack level server boot device 410 can execute one or more of the functionalities described above in response to receiving a command from a remote user device 430. In some embodiments, the rack level server boot device 410 can execute one or more of the functionalities described above in response to a local action. For example, the rack level server boot device 410 may boot or reboot an OS boot image in response to a user manually operating the power button of a server 420 (i.e., turning the server 420 on or off) or manually operating a reset button of the server 420. Further, in some embodiments, the system 400 may allow a user to log in to the OS of a server 420 remotely, (e.g., log into LINUX™ WINDOWS™ or the like) via secure shell (ssh), remote login (rlogin), Remote Desktop Protocol (RDP), Virtual Desktop Infrastructure (VDI) or the like, and may use normal OS commands and actions. For example, as will be appreciated by those of skill in the art, a user that is remotely logged in to the OS of a server 420 can input a command to remotely restart, shut down, reboot or otherwise such commands that will be locally executed by the server 420.

According to some embodiments, servers 420 can be implemented as a computer system or processing system, such as the processing system 300 described hereinabove and illustrated in FIG. 3. Each server 420 can include at least one port 422 for providing a connecting (via cabling 431) to the rack level server boot device 410. For example, each server 420 of the plurality of servers 420 may be connected to the rack level server boot device 410 by a corresponding cable that connects to one of the ports 43 of the rack level server boot device 410. As will be appreciated, a plurality of servers 420 may be stacked in a server rack along with the rack level server boot device 410.

In exemplary embodiments, user devices 430 can include, but are not limited to, a smartphone, a wearable device such as a smartwatch, an augmented reality headset, a tablet, a computer system such as the one shown in FIG. 3, a smart speaker, a television, or any other suitable electronic device. The user device 430 includes a processor 432, one or more input/output (I/O) devices 434, a display 436 and a transceiver 438. I/O devices 434 can include any input device, such as a keyboard (either physical or digital), a gyroscope for detecting gestures that can server as user input commands, a microphone for detecting oral user inputs (i.e., voice commands), finger print reader for authenticating a user, and/or a camera for detecting visual commands (e.g., hand gestures). User devices 430 can be configured to cause the rack level server boot device 410 to execute one or more functionalities based on a detected command or user input. In some embodiments, display 436 is configured to display images, software application interfaces, websites and other visual media. In some embodiments, display 436 can be a touchscreen that may be configured to detect tactile user inputs (e.g., typing, pressing, swiping, etc.). Transceiver 438 can be configured to allow a user device 430 to communicate with other devices via communications network 415 (e.g., via Wi-Fi, cellular communications, etc.). According to some embodiments, a user device 430 includes software that provides a user interface to allow a user to input commands for the rack level server boot device 410. In some embodiments, a user may be required to be authenticated by the rack level server boot device 410 prior to being allowed to send commands, by for example, entering a username and password. In some embodiments, the functionalities and access to servers 420 presented by the user interface may be a function of a security clearance level associated with the user. For example, in some embodiments, users with higher security clearance levels may have access to more functionalities or servers 420.

Figure 5:
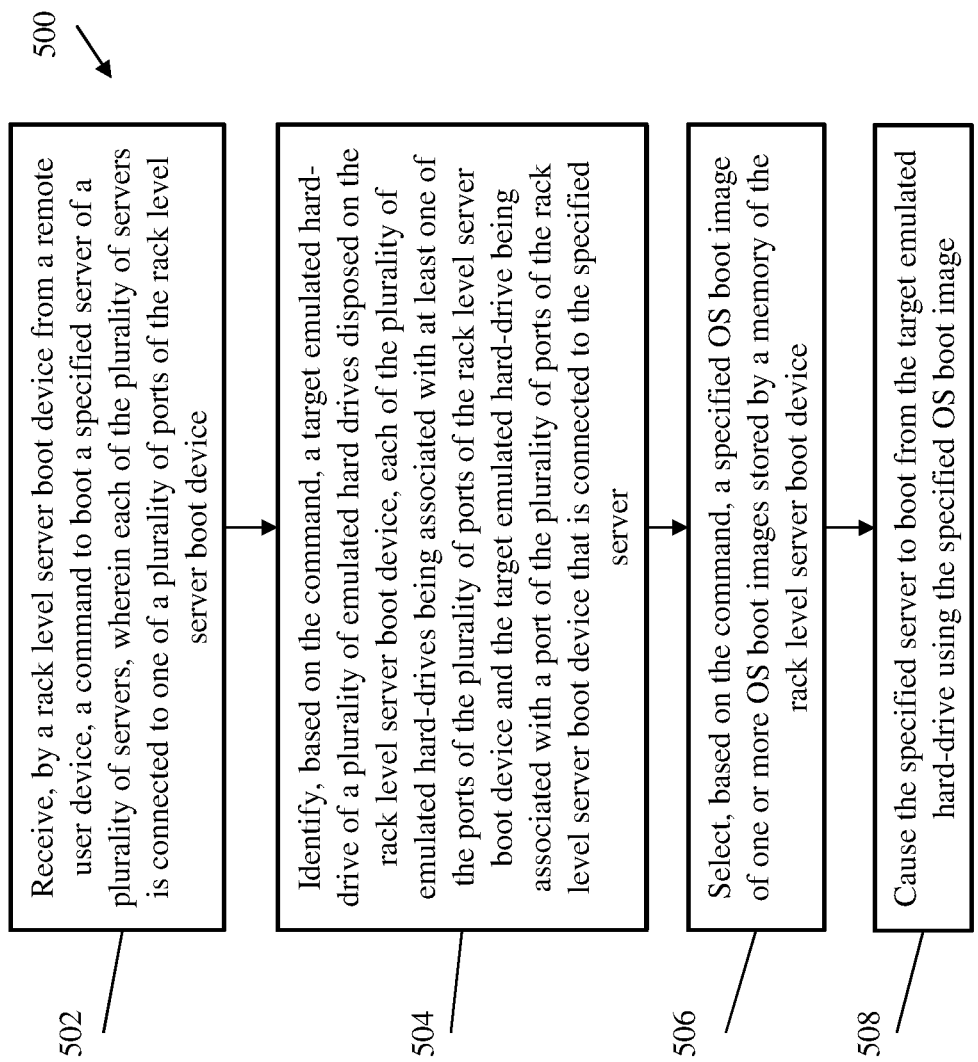
FIG. 5 depicts a flow diagram of a method for remotely providing local server boot capabilities according to one or more embodiments of the invention.

Turning now to FIG. 5, a flow diagram of a method 500 for remotely providing local server boot capabilities in accordance with an embodiment is shown. In one or more embodiments of the present invention, the method 500 may be embodied in software that is executed by computer elements located within a network that may reside in the cloud, such as the cloud computing environment 50 described hereinabove and illustrated in FIGS. 1 and 2. In other embodiments, the computer elements may reside on a computer system or processing system, such as the processing system 300 described herein above and illustrated in FIG. 3, or in some other type of computing or processing environment.

The method 500 begins at block 502 and includes receiving, by a rack level server boot 410 from a remote user device 430, a command to boot a specified server 420 of a plurality of servers 420, wherein each of the plurality of servers 420 is connected to one of a plurality of ports 413 of the rack level server boot device 410 as described above. According to some embodiments, the plurality of ports 413 can be USB ports. In some embodiments, the rack level server boot device 410 may have a body that is configured to fit into a server rack, by for example, having a body that is one rack unit in height.

Next, as shown at block 504, the method includes identifying, based on the command, a target emulated hard drive of a plurality of emulated hard drives disposed on the rack level server boot device 410. An emulated hard drive can be a virtual disk or a virtual drive, which is a software component that emulates an actual disk drive, such as an optical disc drive, a floppy disk drive, hard disk drive, or a USB flash drive. According to some embodiments, an emulated hard drive can be implemented as one of a disk image, which is a computer file that contains the exact data structure of an actual storage device, such as a hard disk drive (HDD). As described previously above, the rack level server boot device 410 can be configured to create a plurality of emulated hard drives and each of the plurality of emulated hard drives can be associated with at least one of the ports 413 of the plurality of ports 413 of the rack level server boot device 410. According to some embodiments, each of the plurality of emulated hard drives can be associated with a unique port 413 of the plurality of ports 413. In some embodiments, an emulated hard drive may be associated with more than one port 413 of the plurality of ports 413. The target emulated hard drive can be associated with a port 413 of the plurality of ports 413 of the rack level server boot device 410 that is connected to the specified server 420.

As shown at block 506, the method includes selecting, based on the command, a specified OS boot image of one or more OS boot images stored by a memory of the rack level server boot device 410. For example, a remote user of a user device 430 may generate a command to boot a particular server 420 with a selected OS boot image. In some embodiments, a user interface of the user device 430 may display a list of available OS boot images that may be selected for use in booting a selected server 420. As described previously above, each of the one or more OS boot images can include an operating system and one or more applications (e.g., third party software). Further, in some embodiments, multiple OS boot images of the one or more OS boot images may be derived from one copy an operating system and/or one copy of an application stored by the rack level server boot device 410.

As shown at block 508, the method includes causing the specified server 420 to boot from the target emulated hard drive using the specified OS boot image. For example, the specified server 420 can be configured to snoop or monitor its connection 431 with the rack level server boot device 410 to detect signals from the rack level server boot device 410 that are representative of commands to boot, reset, reboot, power on, power off and the like. Upon detecting a boot signal, the specified server 420 may interact with the emulated hard drive that corresponds to the port 413 to which the specified server 420 is connected to boot using the specified OS boot image. Accordingly, in some embodiments, in response to receiving one or more commands from the remote user device 430, the rack level server boot device 410 can be configured to reset, reboot, power on and/or power off one or more selected servers 420 of the plurality of servers 420.

According to some embodiments, the method 500 can further include authenticating, based on user credentials received from a remote user device 430, a remote user accessing the rack level server boot device 410 and providing, to the remote user via the remote user device 430, a set of optional functionalities based on a security clearance associated with the remote user. In some embodiments, the method 500 can further include generating activity logs based on the activity of the remote user, server activity and/or failure activity, and storing the activity logs (e.g., in database 412). In this way, according to some embodiments, the rack level server boot device 410 can control user access to various servers 420, control access to the functionalities offered to various users, and keep a record of activity that may be used to identify problems.

In some embodiments, the method 500 can further include receiving an update to an OS boot image and causing, by one or more of the plurality of emulated hard drives of the rack level server boot device 410, one or more corresponding servers to reboot using the updated OS boot image, the corresponding servers being connected to ports 413 associated with the one or more of the plurality of emulated hard drives. In this way, the system 400 can easily propagate updates to OS boot image to the necessary servers 420.

Further, in some embodiments, a user interface of a remote user device 430 may allow a user to edit or modify OS boot images stored by the rack level server boot device 410 or even upload new OS boot images to the rack level server boot device 410.

According to some embodiments, the method 500 can further include storing a physical rack location (e.g., server rack location) of each of the plurality of servers 420 based on a known cabling pattern 431 between the plurality of servers 420 and the rack level server boot device 410 and modifying the specified OS boot image to include the physical rack location of the specified server 420 of the plurality of servers 420. For example, in some embodiments, a number of a port 413 can easily be translated into a physical rack location which can be inserted into the OS boot image served. According to some embodiments, the hostname assigned in the OS might be built from the physical information, so when interacting with a server OS remotely, the physical location can be easily implied. For example, "compute.node1.localhost" can be easily assigned to the lowest server 420 in the rack. Accordingly, the disclosed system 400 provides inherent advantages over a conventional network boot approach because since a conventional network boot server only knows the Ethernet MAC address of the booting server, there is no way to map an Ethernet MAC address to a physical position in a rack, whichs means the locations/addresses of servers 420 may be difficult to configure and/or determine in a conventional network boot approach.

Additional processes may also be included. It should be understood that the processes depicted in FIG. 5 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The invention claimed is:

1. A computer-implemented method comprising:
   receiving, by a rack level server boot device from a remote user device, a command to boot a specified server of a plurality of servers, wherein each of the plurality of servers is connected to one of a plurality of ports of the rack level server boot device;
   identifying, based on the command, a target emulated hard drive of a plurality of emulated hard drives disposed on the rack level server boot device, each of the plurality of emulated hard drives being associated with at least one of the ports of the plurality of ports of the rack level server boot device and the target emulated hard drive being associated with a port of the plurality of ports of the rack level server boot device that is connected to the specified server;
   selecting, based on the command, a specified OS boot image of one or more OS boot images stored by a memory of the rack level server boot device; and
   causing the specified server to boot from the target emulated hard drive using the specified OS boot image.

2. The computer-implemented method of claim 1, wherein the plurality of ports comprise USB ports.

3. The computer-implemented method of claim 1, wherein the rack level server boot device has a body that is approximately one rack unit in height.

4. The computer-implemented method of claim 1, wherein each of the one or more OS boot images comprises an operating system and one or more applications.

5. The computer-implemented method of claim 4, wherein multiple OS boot images of the one or more OS boot images may be derived from one copy an operating system and/or one copy of an application stored by the rack level server boot device.

6. The computer-implemented method of claim 1, wherein in response to receiving one or more commands from the remote user device, the rack level server boot device is configured to reset, reboot, power on and/or power off one or more selected servers of the plurality of servers.

7. The computer-implemented method of claim 1, the method further comprising:
   authenticating, based on user credentials received from a remote user device, a remote user accessing the rack level server boot device; and
   providing, to the remote user via the remote user device, a set of optional functionalities based on a security clearance associated with the remote user.

8. The computer-implemented method of claim 7, the method further comprising:
   generating activity logs based on activity of the remote user, server activity and/or failure activity; and
   storing the activity logs.

9. The computer-implemented method of claim 1, the method further comprising:
   receiving an update to an OS boot image; and
   causing, by one or more of the plurality of emulated hard drives of the rack level server boot device, one or more corresponding servers to reboot using an updated boot image, the corresponding servers being connected to ports associated with the one or more of the plurality of emulated hard drives.

10. The computer-implemented method of claim 1, the method further comprising:
    storing a physical rack location of each of the plurality of servers based on a known cabling pattern between the plurality of servers and the rack level server boot device; and
    modifying the specified OS boot image to include the physical rack location of the specified server of the plurality of servers.

11. A system comprising:
    a processor communicatively coupled to a memory, the processor configured to:
    receive, from a remote user device, a command to boot a specified server of a plurality of servers, wherein each of the plurality of servers is connected to one of a plurality of ports of a rack level server boot device;
    identify, based on the command, a target emulated hard drive of a plurality of emulated hard drives disposed on the rack level server boot device, each of the plurality of emulated hard drives being associated with at least one of the ports of the plurality of ports of the rack level server boot device and the target emulated hard drive being associated with a port of the plurality of ports of the rack level server boot device that is connected to the specified server;
    select, based on the command, a specified OS boot image of one or more OS boot images stored by a memory of the rack level server boot device; and cause the specified server to boot from the target emulated hard drive using the specified OS boot image.

12. The system of claim 11, wherein the plurality of ports comprise USB ports.

13. The system of claim 11, wherein the rack level server boot device has a body comprising that is approximately one rack unit in height.

14. The system of claim 11, wherein each of the one or more OS boot images comprises an operating system and one or more applications.

15. The system of claim 14, wherein multiple OS boot images of the one or more OS boot images may be derived from one copy an operating system and/or one copy of an application stored by the rack level server boot device.

16. The system of claim 11 in response to receiving one or more commands from the remote user device, the rack level server boot device is configured to reset, reboot, power on and/or power off one or more selected servers of the plurality of servers.

17. The system of claim 11, wherein the processor is further configured to:
  authenticate, based on user credentials received from a remote user device, a remote user accessing the rack level server boot device; and
   provide, to the remote user via the remote user device, a set of optional functionalities based on a security clearance associated with the remote user.

18. A computer program product comprising a computer readable storage medium having program instructions embodied therewith, the program instructions executable by a computer processor to cause the computer processor to perform a method, the method comprising:
  receiving, by a rack level server boot device from a remote user device, a command to boot a specified server of a plurality of servers, wherein each of the plurality of servers is connected to one of a plurality of ports of the rack level server boot device;
  identifying, based on the command, a target emulated hard drive of a plurality of emulated hard drives disposed on the rack level server boot device, each of the plurality of emulated hard drives being associated with at least one of the ports of the plurality of ports of the rack level server boot device and the target emulated hard drive being associated with a port of the plurality of ports of the rack level server boot device that is connected to the specified server;
  selecting, based on the command, a specified OS boot image of one or more OS boot images stored by a memory of the rack level server boot device; and
  causing the specified server to boot from the target emulated hard drive using the specified OS boot image.

19. The computer program product of claim 18, wherein the plurality of ports comprise USB ports.

20. The computer program product of claim 18, wherein each of the one or more OS boot images comprises an operating system and one or more applications.

* * * * *